(No Model.)

W. E. SEVERANCE.
CENTERING TOOL.

No. 598,018. Patented Jan. 25, 1898.

Witnesses.
Lauritz N. Möller
Henry R. Page

Inventor
William E. Severance
by Alban Andrew
his atty.

UNITED STATES PATENT OFFICE.

WILLIAM E. SEVERANCE, OF MOUNT AUBURN, MASSACHUSETTS.

CENTERING-TOOL.

SPECIFICATION forming part of Letters Patent No. 598,018, dated January 25, 1898.

Application filed April 23, 1897. Serial No. 633,503. (No model.)

*To all whom it may concern:*

Be it known that I, WILLIAM E. SEVERANCE, a citizen of the United States, and a resident of Mount Auburn, in the county of Middlesex and State of Massachusetts, have invented new and useful Improvements in Centering-Tools, of which the following, taken in connection with the accompanying drawings, is a specification.

This invention relates to improvements in centering-tools for the purpose of readily centering articles to be turned, &c.; and it is carried out as follows, reference being had to the accompanying drawings, wherein—

Figure 4:
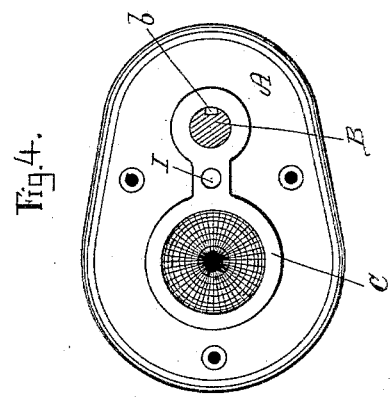
Figure 3:
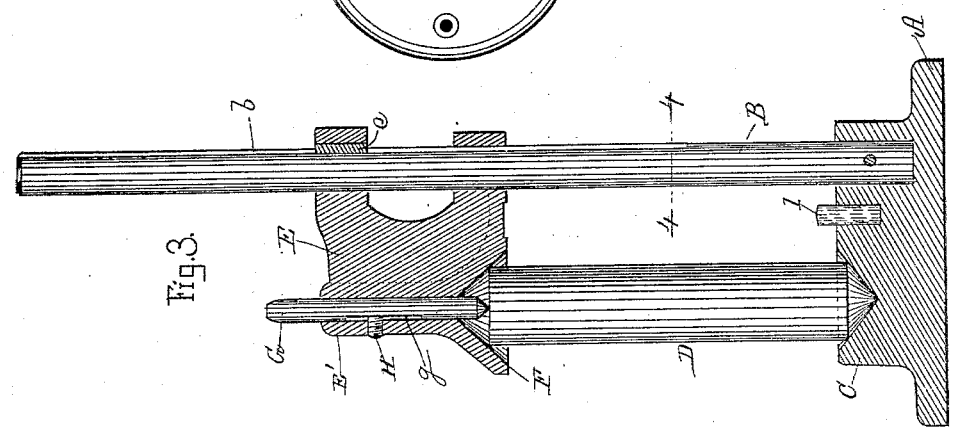
Figure 2:
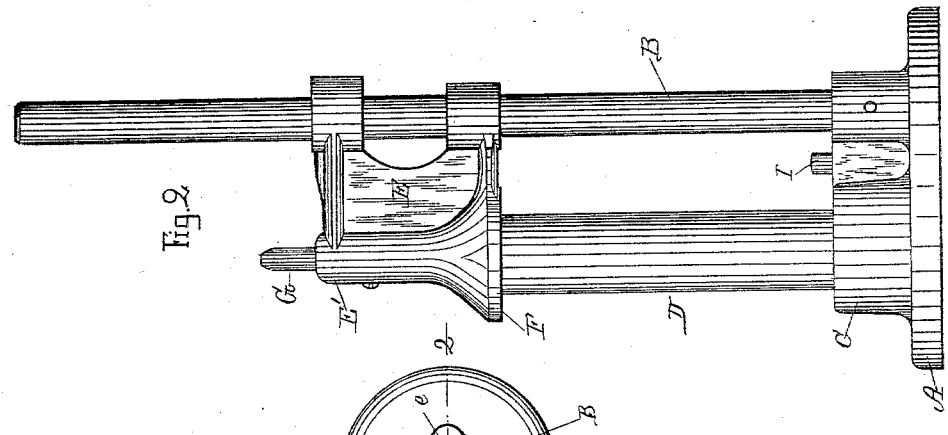
Figure 1:
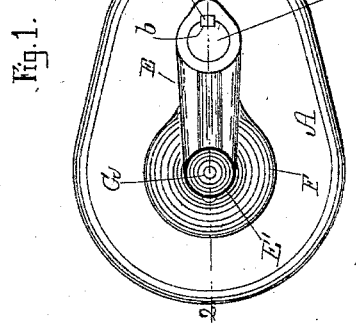

Figure 1 represents a top plan view of the invention. Fig. 2 represents a side elevation. Fig. 3 represents a central vertical section; and Fig. 4 represents a cross-section on the line 4 4, shown in Fig. 3.

Similar letters refer to similar parts wherever they occur on the different parts of the drawings.

The device consists of a metal base A, to which is secured a vertical spindle or standard B, as shown. Integral with the base A or suitably secured thereto is a conical lower centering-cup C, adapted to receive the lower end of the bar or article D that is to be centered. On the standard B is vertically adjustable the guide-block E, which is provided on its under side with an inverted conical centering-cup F, arranged centrally above the lower cup C, as shown in the drawings. The said adjustable conical cup F serves for the purpose of receiving the upper end of the bar or article D during the centering operation, as shown in Figs. 2 and 3.

The guide-block E is freely adjustable up and down on the standard B, but is prevented from turning around the latter, and in practice I prefer to make a longitudinal groove b on one side of said standard adapted to receive a key or projection e on the guide-block E, as shown in the drawings; but I do not wish to confine myself to such precise arrangement, as I may to equal advantage use other or similar means for preventing the said guide-block and its centering-cup from turning around the said standard.

In the outer portion of the guide-block E is a vertical perforated hub E', in which is vertically adjustable the prick-punch G, as shown. Said prick-punch is located axially in a line with the conical centering-cups C and F, as shown in the drawings.

The prick-punch G is limited in its vertical adjustment in the hub E' preferably by making a cut-away portion g on one side of said prick-punch, adapted to receive a pin or projection H, secured to the hub E', as shown in Fig. 3.

In using the device for centering purposes the guide-block E and its cup F are raised the proper distance above the lower cup C, according to the length of the article to be centered. The lower end of the article D is then placed in the lower conical centering-cup C, causing such lower end to be centrally retained in said cup C. The upper cup F is then lowered until it rests upon the upper end of the article D, by which such upper end of the article is likewise properly centered.

In practice the operator holds the guide-block E, with its cup F, against the upper end of the article to be centered, while with a hammer he strikes on the upper end of the prick-punch G, causing its lower pointed end to make a centering-recess in the upper end of said article. After the upper end of the article has thus been centered it is removed from the centering-cups and reversed in position for the purpose of in a like manner center-punching its opposite end.

In practice I prefer to interpose between the guide-block E and base of the tool an elastic or yielding cushion I, preferably made of rubber, for the purpose of deadening the shock in case the guide-block E should accidentally be dropped on the standard B after the article to be centered has been removed from between the centering-cups. By this arrangement articles may readily be centered without the time-consuming operation of clamping such article in a vise or other equivalent clamping device.

What I wish to secure by Letters Patent and claim is—

1. In a centering-tool, the combination of a base having a fixed lower conical centering-cup, a vertical standard rising from said base, a vertically-adjustable guide-block sliding on the standard and having formed therein an inverted conical centering-cup, and a vertically-movable prick-punch arranged in alinement with the axes of the centering-cups, substantially as described and for the purpose specified.

2. In a centering-tool, the combination of a base having a fixed lower conical centering-cup, a vertical standard rising from said base, a vertically-adjustable guide-block sliding on the standard, means for preventing the guide-block turning on the standard, an inverted conical centering-cup formed in the under side of the guide-block, a vertically-movable prick-punch arranged in alinement with the axes of the centering-cups, and means for limiting the vertical movement of the prick-punch in the guide-block, substantially as described, and for the purpose specified.

3. In a centering-tool, the combination of a base having a fixed lower conical centering-cup, a vertical standard rising from said base, a vertically-adjustable guide-block sliding on the standard, an inverted conical centering-cup formed in the under side of the guide-block, a vertically-movable prick-punch arranged in alinement with the axes of the centering-cups, and an elastic cushion arranged adjacent to one of said centering-cups and projecting beyond the face thereof, substantially as described, and for the purpose specified.

In testimony whereof I have signed my name to this specification, in the presence of two subscribing witnesses, on this 17th day of April, A. D. 1897.

WILLIAM E. SEVERANCE.

Witnesses:
ALBAN ANDRÉN,
LAURITZ N. MÖLLER.